United States Patent
Liu

(10) Patent No.: US 10,495,067 B2
(45) Date of Patent: Dec. 3, 2019

(54) MECHANICAL POWER CONVERSION DEVICE

(71) Applicant: Wen-Ching Liu, Taipei (TW)

(72) Inventor: Wen-Ching Liu, Taipei (TW)

( * ) Notice: Subject to any disclaimer, the term of this patent is extended or adjusted under 35 U.S.C. 154(b) by 91 days.

(21) Appl. No.: 15/971,649

(22) Filed: May 4, 2018

(65) Prior Publication Data

US 2018/0340516 A1 Nov. 29, 2018

(30) Foreign Application Priority Data

May 23, 2017 (TW) .............................. 106117027 A

(51) Int. Cl.
*F03D 15/10* (2016.01)
*F16H 21/36* (2006.01)
*F16H 47/08* (2006.01)
*F16H 37/12* (2006.01)

(52) U.S. Cl.
CPC ............. *F03D 15/10* (2016.05); *F16H 21/36* (2013.01); *F16H 37/124* (2013.01); *F16H 47/08* (2013.01); *F05B 2210/16* (2013.01)

(58) Field of Classification Search
None
See application file for complete search history.

(56) References Cited

U.S. PATENT DOCUMENTS

| | | | | |
|---|---|---|---|---|
| 3,015,970 A * | 1/1962 | Mueller | .................. | F16H 48/08 475/89 |
| 3,132,536 A * | 5/1964 | Sampietro | .............. | B60K 17/06 475/60 |
| 4,272,993 A * | 6/1981 | Kopich | ................... | F16H 48/10 475/90 |
| 7,025,700 B1 * | 4/2006 | Hoelscher | ............... | F16H 48/08 475/84 |
| 7,682,280 B2 * | 3/2010 | Waksmundzki | ........ | F16H 48/08 475/235 |
| 8,475,319 B2 * | 7/2013 | Forssberg | ............... | F16D 13/74 475/230 |
| 8,550,951 B2 * | 10/2013 | Savoy | ..................... | F16H 48/08 475/230 |

* cited by examiner

*Primary Examiner* — Colby M Hansen
(74) *Attorney, Agent, or Firm* — Chun-Ming Shih

(57) ABSTRACT

A mechanical power conversion device includes a housing filled with a fluid, at least one control assembly arranged in the housing, and at least one stationary sleeve. The control assembly includes an input shaft and an intermediate output shaft, and defines a fluid inlet port and a fluid outlet port. The stationary sleeve is arranged in the housing. The input shaft is installed with an impeller device in the stationary sleeve. A movable sleeve is fitted around the stationary sleeve such that the distance between the movable sleeve and the control assembly can be adjusted. The impeller device can be rotated by the input shaft to force the fluid to enter the control assembly via the fluid inlet port and exit the control assembly via the fluid outlet port to control mechanical power or torque being transferred from the input shaft to the intermediate ouput shaft.

12 Claims, 14 Drawing Sheets

(B-B)

(C-C)

MECHANICAL POWER CONVERSION DEVICE

TECHNICAL FIELD OF THE INVENTION

The present invention relates to a mechanical power conversion device, which involves a fluid as a medium to control mechanical power or torque being transferred from an input shaft to an output shaft.

DESCRIPTION OF THE PRIOR ART

It is known that the conventional torque conversion technology is mainly applied to vehicles. Typically, a torque converter is a form of fluid coupling, which includes two oppositely arranged propellers respectively connected to an input shaft and an output shaft, wherein one propellert can drive oil to rotate the other propeller, so that mechanical power can be transferred from the input shaft to the output shaft. However, the power supplied to one propeller cannot be completely transferred to the other propeller, thus causing power loss in this type of torque converter.

Generally, the conventional techniques for reducing rotational speed employ brake linings to force against a drum or disk. However, when the linings are used continuously for a long time, overheating may occur and thus causing brake failure.

There are two types of conventional compressors: piston type and scroll type. Although a compressor of scroll type has a high efficiency, the pressure is insufficient and difficult to increase, and thus it is not suitable for an application requiring higher pressure. Although a compressor of piston type can produce higher pressure, the piston thereof compresses only once every cycle, and thus it is difficult to increase the efficiency.

In addition, conventional combustion engines have a cylinder, in which fuel explosion can drive a piston to rotate a crankshaft to supply mechanical power. However, half of the explosion power impacts on the piston, and the other half of the explosion power impacts on the cylinder head. The explosion power impacting on the cylinder head can be reflected back after losing about 10% of power. However, there is time difference between the first and second impact on the piston. Therefore, the fuel explosion power cannot be completely converted to machanical power in moving the piston.

In order to solve the above problems, a ring-disc reciprocating power conversion device, as disclosed in US Patent Publication No. 9194474 B2, has been developed, which employs a number of stems (spacers) fitted at a disk, which can be driven by a planetary gearset to conduct reciprocating rotation. The stems can be adjusted by a rope to enter or leave respective chambers to control the resistance the disk is subjected to while conducting reciprocating rotation, so as to control mechanical power being transferred from an input shaft to an output shaft thereof There is still room for further improvement.

SUMMARY OF THE INVENTION

In view of the foregoing, one object of the present invention is to provide a mechanical power conversion device, which has an improved performance over conventional devices. The technical measure generally includes a housing filled with a fluid, at least one control assembly arranged in the housing, and at least one stationary sleeve corresponding in number to the control assembly. The control assembly includes an input shaft and an intermediate output shaft, and defines one or more fluid inlet ports and one or more fluid outlet ports, wherein the fluid inlet ports are located at a distance farther from the input shaft than the fluid outlet ports. The stationary sleeve is arranged in the housing. The input shaft extends through the stationary sleeve and extends out of the housing and is installed with an impeller device in the stationary sleeve. The intermediate output shaft is coupled to a final output shaft. A movable sleeve is fitted around the stationary sleeve such that the movable sleeve can be adjusted to move along the stationary sleeve to approach the control assembly and enclose the fluid outlet ports. The impeller device can be rotated by the input shaft to force the fluid to enter the control assembly via the fluid inlet ports and exit the control assembly via the fluid outlet ports to control mechanical power or torque being transferred from the input shaft to the intermediate ouput shaft.

According to one aspect of the present invention, the control assembly includes a case, a sun gear and a plurality of planet pinions located in the case, wherein the planet pinions are mounted at a carrier and meshed with the sun gear, the input shaft is joined to a rotation center of the sun gear, and the intermediate output shaft extends from the carrier.

According to another aspect of the present invention, the control assembly further includes a disk in the case. An annular space is defined between the case and the disk. A lower cover is fixedly attached to a lower surface of the disk. A first sliding plate is pivotally connected to a first eccentric pin provided at one end of one planet pinion. A second sliding plate is pivotally connected to a second eccentric pin provided at an opposite end of the planet pinion and located at one side of a rotation center of the planet pinion opposite to the first eccentric pin. The lower cover defines a first guide groove at its lower surface to accommodate the first sliding plate. The case defines a second guide groove at its inner bottom surface to accommodate the second sliding plate. As such, when the planet pinions are rotated by the sun gear, the first sliding plate are moved forth and back along the first guide groove, and the second sliding plate are moved forth and back along the second guide groove, so that the disk are guided by the first and second sliding plates to conduct reciprocating rotation relative to the case.

According to the above technical measure, the impeller device can be driven by the input shaft, the distance between the movable sleeve and the control assembly can be adjusted, the stems fitted at the disk can be controlled to move into or away from the respective chambers to control mechanical power or torque being transferred from the input shaft to the intermediate output shaft to meet the requirement of a piece of equipment.

Other objects, advantages, and novel features of the present invention will become more apparent from the following detailed description when taken in conjunction with the accompanying drawings.

DETAILED DESCRIPTION OF THE PREFERRED EMBODIMENTS

Figure 1:
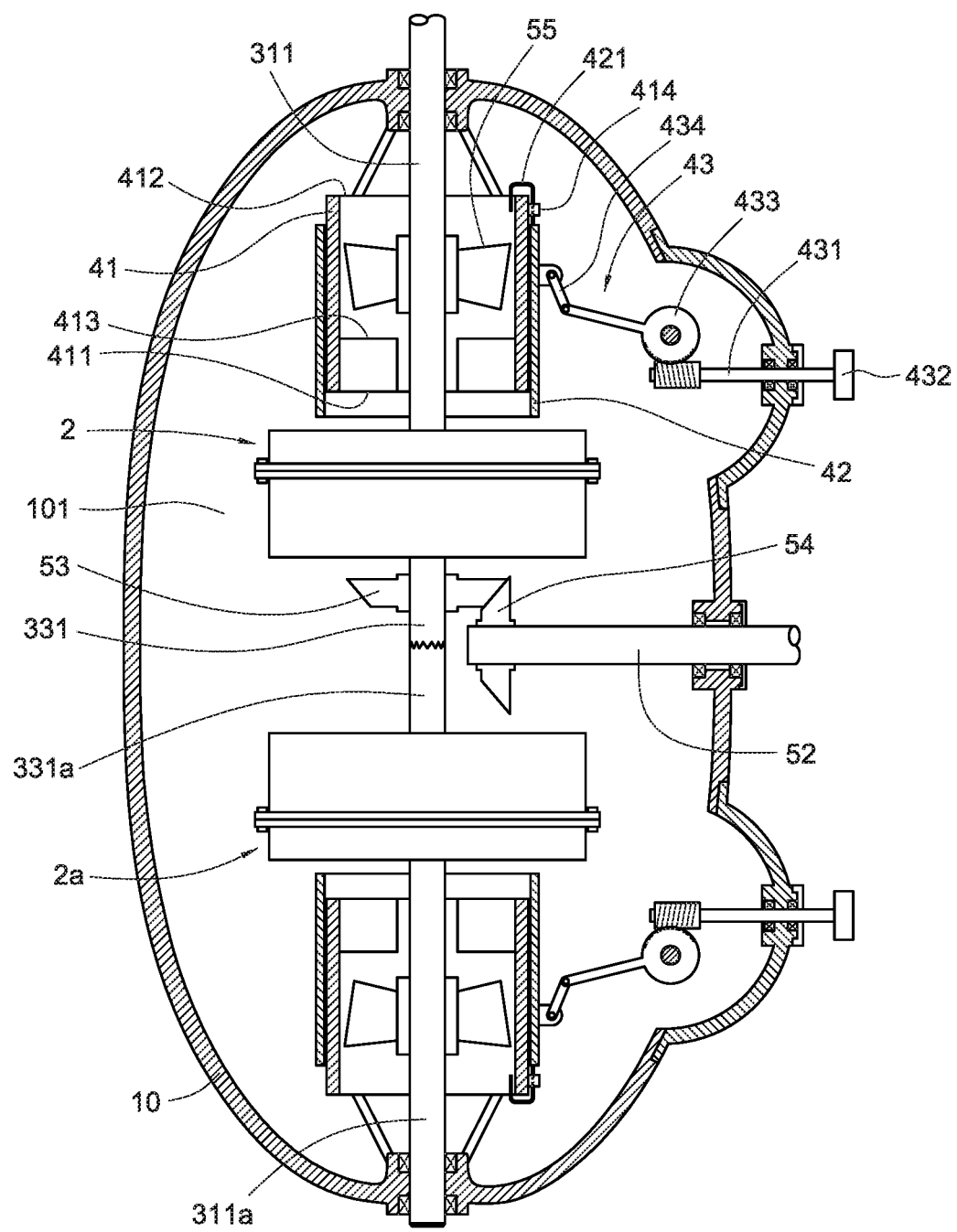
FIG. 1 shows a schematic view of a mechanical power conversion device according to one embodiment of the present invention.
Figure 2:
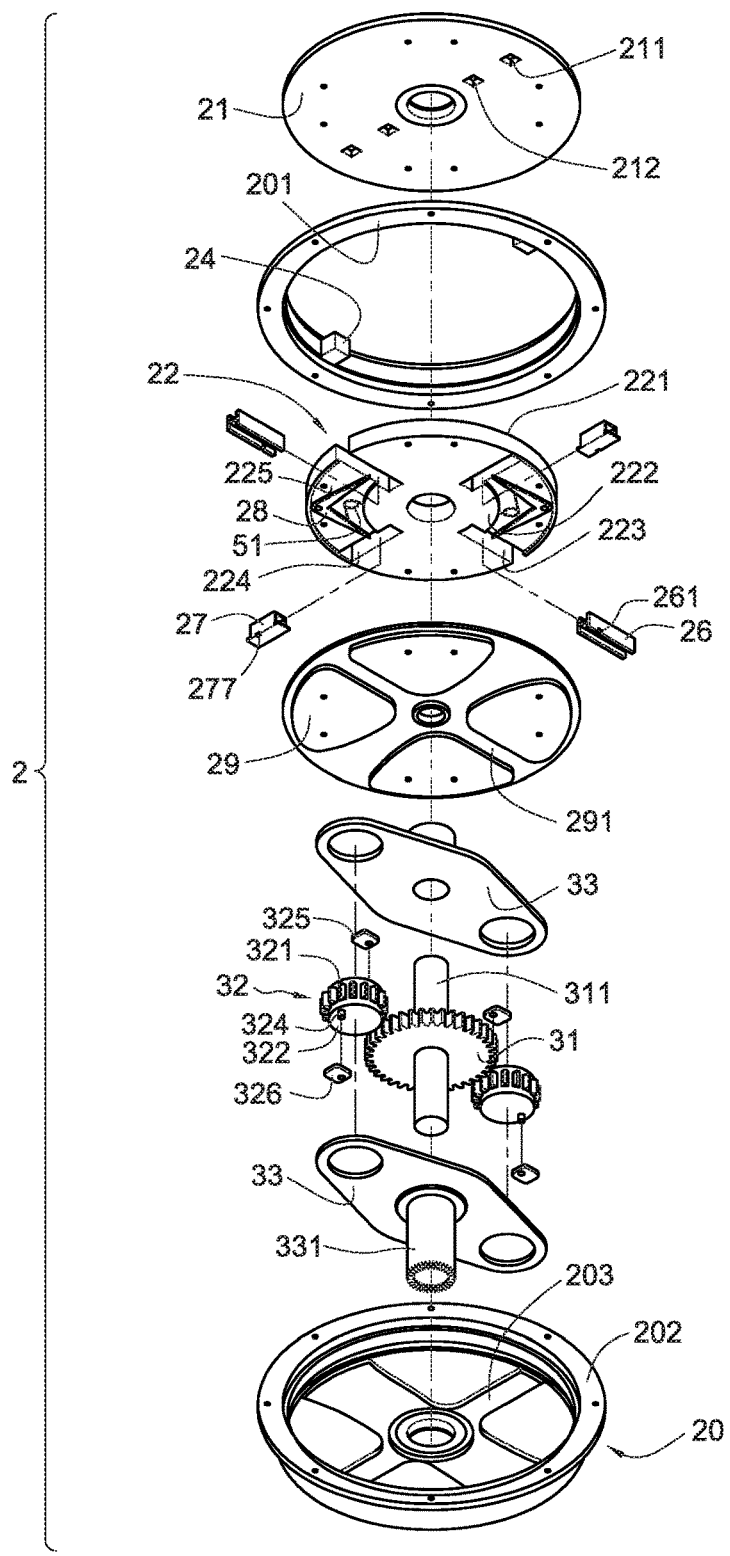
FIG. 2 shows an exploded view of a control assembly used in the mechanical power conversion device.
Figure 3:
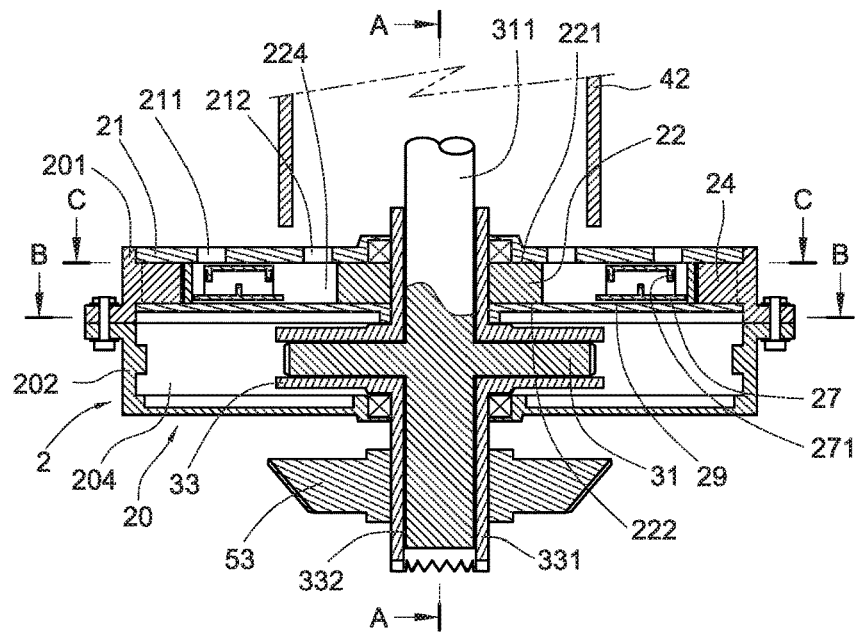
FIG. 3 shows a sectional view of the control assembly.
Figure 4:
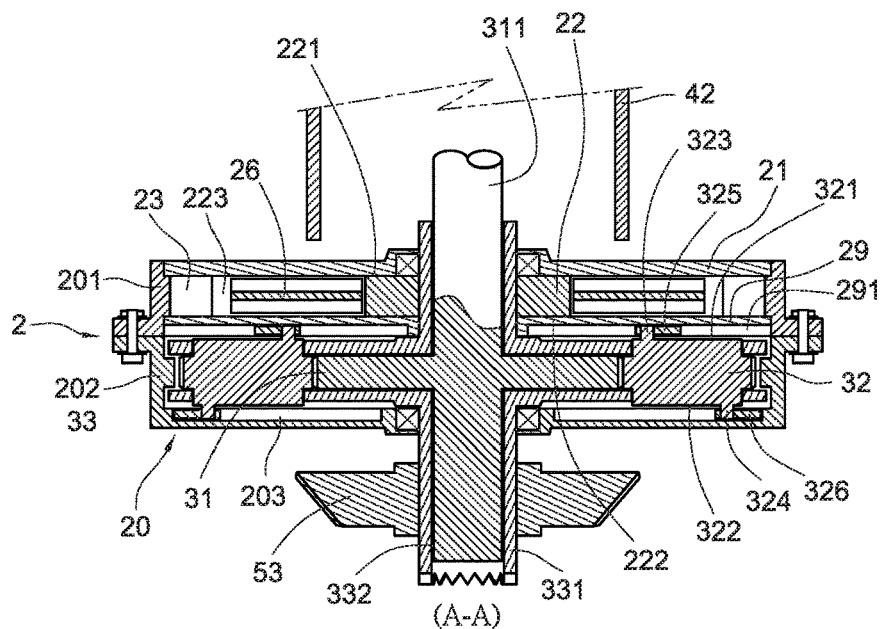
FIG. 4 shows a sectional view taken along line A-A in FIG. 3.
Figure 5:
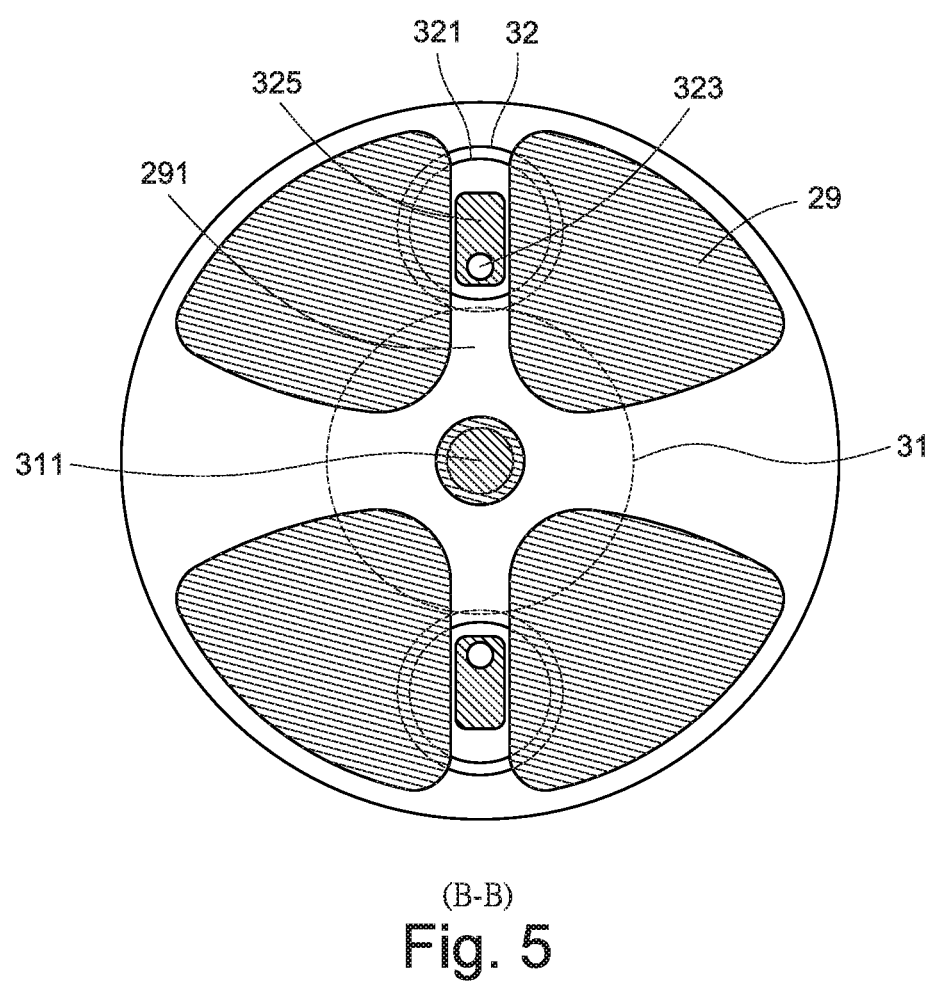
FIG. 5 shows a sectional view taken along line B-B in FIG. 3.

Referring first to FIGS. 1 through 6, a mechanical power conversion device according to one embodiment of the present invention is shown, which generally comprises a housing 10, at least one control assembly 2, and at least one stationary sleeve 41, which corresponds in number to the control assembly 2.

The housing 10 defines therein a space 101 filled with a fluid, such as an engine oil. The control assembly 2, which is located in the space 101, includes an input shaft 311 and an intermediate output shaft 331, which is coaxial with the input shaft 311 and coupled to a final output shaft 52. For example, the intermediate output shaft 331 can be coupled to the final output shaft 52 by two meshed bevel gears 53, 54. One end of the input shaft 311 extends out of the housing 10 to serve as a mechanical-power input terminal. The final output shaft 52 extends out of the housing 10 to serve as a mechanical-power output terminal. In this embodiment, there are two control assemblies 2, 2a symmetrically arranged in the housing 10, wherein the input shaft 311 can be connected with the input shaft 311a, and the intermediate output shaft 331 can be connected with the intermediate output shaft 331a. Since the two control assemblies 2, 2a are same in structure. The following paragraphs will illustrate the structure of the control assembly 2 only.

Figure 7:
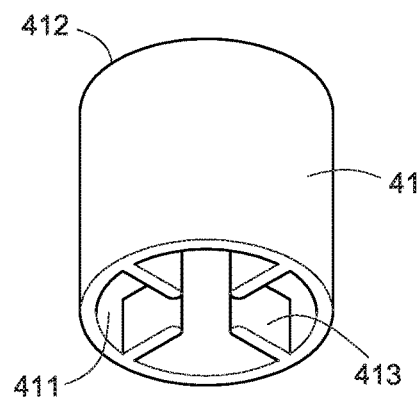
FIG. 7 shows a 3-dimensional view of a stationary sleeve used in the mechanical power conversion device.

The stationary sleeve 41, which is cylindrical in shape and arranged in the housing 10, has a fluid entrance 411 at one end adjacent to the control assembly 2, and a fluid exit 412 at another end, which is distal from the control assembly 2. The input shaft 311 extends through the stationary sleeve 41 and extends out of the housing 10 and is installed with an impeller device 55 in the stationary sleeve 41. The impeller device 55 can be rotated by the input shaft 311 to cause the fluid to enter the stationary sleeve 41 via the fluid entrance 411 and to exit the stationary sleeve 41 via the fluid exit 412. Furthermore, the stationary sleeve 41 is provided with a plurality of guide vanes 413 near its fluid entrance 411. In this embodiment, as shown in FIG. 7, there are four guide vanes 413 provided an inner surface of the stationary sleeve 41, which generally divide the bottom space of the stationary sleeve 41 into four zones to prevent occurrence of one-direction rotational flow to improve the performance of introducing the fluid flowing through the stationary sleeve 41.

Figure 8:
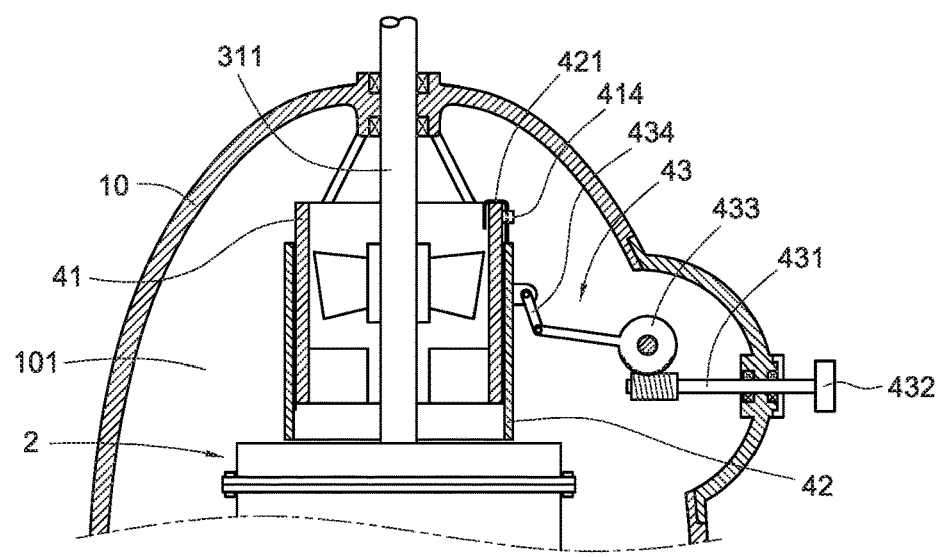
FIG. 8 shows a working view of the mechanical power conversion device, wherein in a movable sleeve fitted around the stationary sleeve is operated to approach the control assembly.

A movable sleeve 42, which is fitted around the stationary sleeve 41, can be moved along the stationary sleeve 41 by an adjustment unit 43 to approach or leave the control assembly 2. The adjustment unit 43 includes a rod 431, one end of which is formed with a worm and meshed with a worm gear 433, and the other end of which is extended out of the housing 10 and provided with a knob 432. The worm gear 433 is pivotally connected to the movable sleeve 42 via a link 434. As such, a user may turn the knob 432 to rotate the worm to enable the worm gear 433 to actuate the link 434 to move the movable sleeve 42 to approach or leave the control assembly 2. Furthermore, the movable sleeve 42 is provided at its top with a limiter 421, which is shaped like a hook, to limit the displacement, especially downward movement. With the limiter 421, the movable sleeve 42 can be prevented from touching the control assembly 2 (see FIG. 8), so that damages due to friction between the movable sleeve 42 and the control assembly 2 can be avoided. In addition, the stationary sleeve 41 can be provided with a guide post 414 for guiding the limiter 421 while the movable sleeve 42 is moving, so that the movable sleeve 42 can be prevented from rotation relative to the stationary sleeve 41.

The control assembly 2 includes a sun gear 31 and a plurality of planet pinions 32 meshed with the sun gear 31. In this embodiment, there are two planet pinions. Also, there is a carrier 33 composed of two opposing frames, between which the sun gear 31 and the planet pinions 32 are disposed. The intermediate output shaft 311 is composed of two segments, each of which extends from a center of one frame of the carrier 33 and defines a central through hole 332. The two planet pinions 32 are rotatably mounted between the two frames of the carrier 33, at two sides of the sun gear 31. The input shaft 311 is joined to a rotation center of the sun gear 31 and rotatably inserted through the central through hole 332 of the intermediate output shaft 331. As such, the input shaft 311 is coaxial with the intermediate output shaft 331.

Figure 17A:
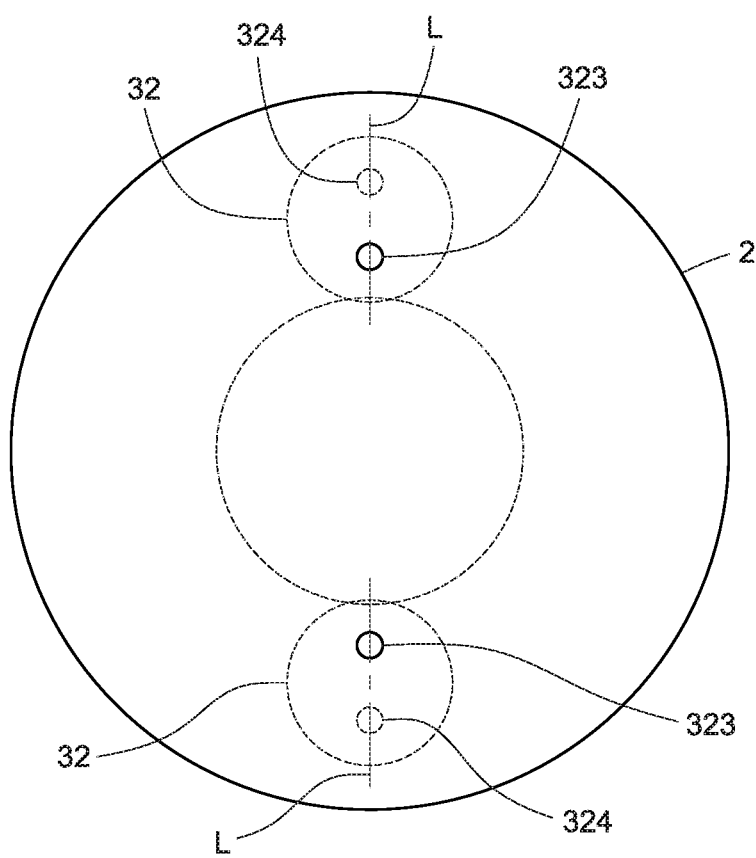
FIGS. 17a and 17b show schematic views of planet pinions arranged in two control assemblies used in the mechanical power conversion device.
Figure 17B:
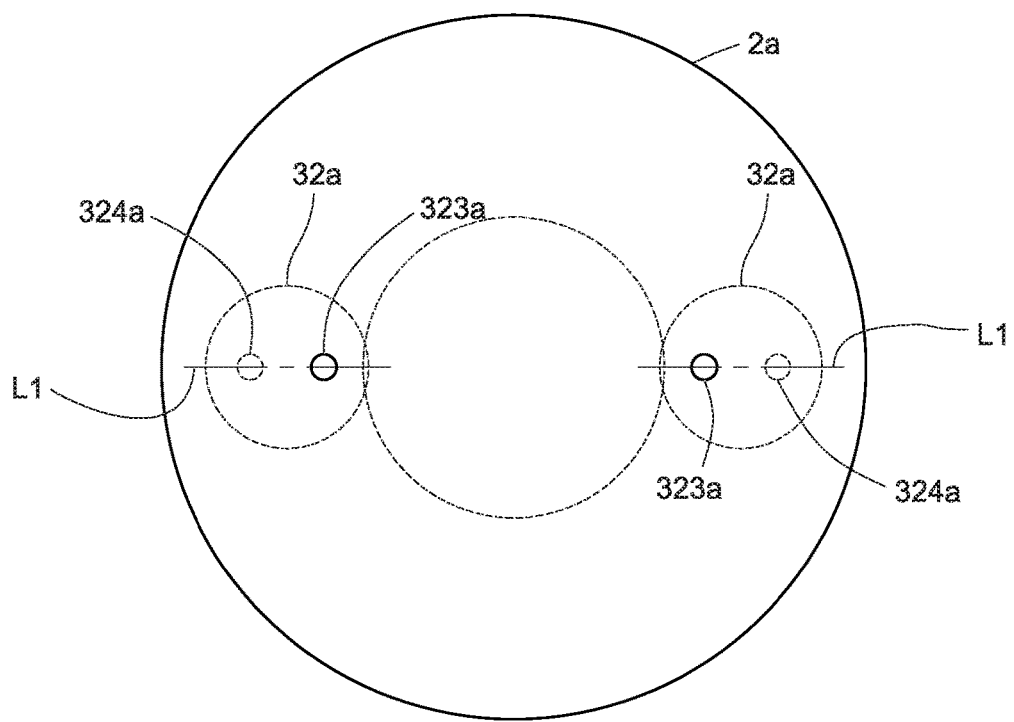

More specifically, each planet pinion 32 has a first shaft portion 321 and a second shaft portion 322 respectively at two opposite ends thereof which allow each pinion 32 to be rotatably mounted at the carrier 33. Furthermore, each pinion 32 is provided with a first eccentric pin 323 on the first shaft portion 321, and a second eccentric pin 324 on the second shaft portion 322. The first and second eccentric pins 323, 324 are located at two sides of a rotation center of the planet pinion 32. As shown in FIG. 17a, the two eccentric pins 323, 324 of one planet pinion 32 are located on line (L); the two eccentric pins 323, 324 of the other planet pinion 32 are also located on line (L). Furthermore, the first eccentric pin 323 is pivotally connected with a first rectangular sliding plate 325; the second eccentric pin 324 is pivotally connected with a second rectangular sliding plate 326. For the control assembly 2a, as shown in FIG. 17b, the two eccentric pins 323a, 324a of one planet pinion 32a are located on line (L1), which is perpendicular to line (L1) shown in FIG. 17a; the two eccentric pins 323a, 324a of the other planet pinion 32 are also located on line (L1).

The control assembly 2 further includes a case 20 and a disk 22, wherein the case 20 is composed of an annular body 201 and a container body 202, which are fastened together by bolts to define therein an inner space 204 for accommodating the disk 22, the sun gear 31, the planet pinions 32 and the carrier 33. The input shaft 311 and the intermediate output shaft 331 extend out of the case 20. The disk 22 is rotatably mounted around the input shaft 311 and the intermediate output shaft 331, over the sun gear 31 and the planet pinions 32. The annular body 201 and the disk 22 define an annular space 23 therebetween. Furthermore, the annular body 201 is provided with one or more protrusions 24 at its inner surface, so that the annular space 23 is divided into one or more chambers 25. The disk 22 defines one or more first radial slots 224, which are spaced apart at equal angular intervals and correspond in number to the chambers 25, and one or more second radial slots 223, which are spaced apart at equal angular intervals and correspond in number to the chambers 25 (i.e. the number of the first radial slots 224 is equal to the number of the second radial slot 223) and communicate with the chambers 25. Preferably, the first radial slots 224 and the second radial slots 223 are arranged alternately. One or more actuators 27, which correspond in number to the chambers 25, are movably fitted in the first radial slots 224. One or more stems 26, which correspond in number to the chambers 25 are movably fitted in the second radial slots 223 (i.e. the number of the actuators 27 is equal to the number of the stems 26).

The disk 22 has a first surface 221, which faces towards the impeller device 55, and a second surface 222, which faces towards the sun gear 31 and the planet pinions 32. An upper cover 21 is fixedly attached on the first surface 221 of the disk 22. Through the upper cover 21, the disk 22 can be rotatably mounted around the input shaft 311 and the intermediate output shaft 331. A lower cover 29 is fixedly attached on the second surface 222 of the disk 22. Thus, the disk 22 together with the upper and lower covers 22, 29 can be rotated about the input shaft 311 and the intermediate output shaft 331. In particular, the disk 22 can be guided by the planet pinions 32 to conduct reciprocating rotation with a predetermined amplitude, as will be illustrated in detail below. The lower cover 29 defines one or more first guide grooves 291 extending radially at its lower surface. The container body 202 defines one ore more second guide grooves 203 extending radially at its inner bottom surface. The first sliding plates 325 pivotally connected at the first eccentric pins 323 are slidably fitted in the first guide grooves 291. The second sliding plates 326 pivotally connected at the second eccentric pins 324 are slidably fitted in the second guide grooves 203. As the sun gear 31 is rotated by the input shaft 311, the planet pinions 32 may revolve around the sun gear 31 together with the carrier 33 as well as rotate on their shaft portions 321, 322, which in turn drives the sliding plates 325, 326 to move forth and back along the first and second guide grooves 291, 203, causing the disk 22 to conduct reciprocating rotation relative to the case 20.

More specifically, the annular space 23 is defined between the annular body 201, the disk 22, the upper cover 21, and the lower cover 29. The fluid contained in the housing space 101 can flow into the annular space 23. In this embodiment, there are two protrusions 24 formed on the inner surface of the annular body 201, so that the annular space 23 is divided into two chambers 25.

In this embodiment, there are two stems 26. Each stem 26 is configured to have an H-shaped cross section to facilitate moving along a second radial slot 223. In use, when the stems 26 are moved into the chambers 25, the disk 22 is subjected to additional resistance or damping force, and thus the reciprocating rotation of the disk 22 can be retarded; in other words, the rotation of the planet pinions 32 on their shaft portions 321, 322 can be decreased. When the stems 26 are moved out of the chambers 25, the reciprocating rotation of the disk 22 can be promoted. In other words, the rotation of the planet pinions 32 on their shaft portions 321, 322 can be increased.

Figure 16:
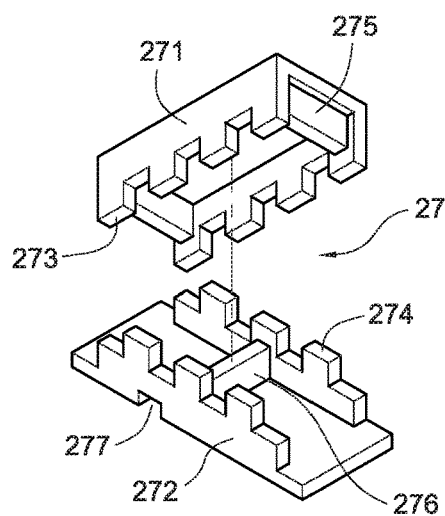
FIG. 16 shows a 3-dimensional exploded view of an actuator used in the control assembly

The first radial slots 224, which do not communicate with the chambers 25, have a length greater than the actuators 27. The upper cover 21 defines one or more fluid inlet ports 211, which correspond in number to the first radial slots 224, and one or more fluid outlet ports 212, which correspond in number to the first radial slots 224 (i.e. the number of the fluid inlet ports 211 is equal to the number of the fluid outlet prts 212). Each fluid inlet port 211 and its corresponding fluid outlet port 212 are located at two opposite ends of one of the first radial slots 224, wherein the fluid inlet port 211 is located at a distance farther from the input shaft 311 than the fluid outlet port 212, so that the fluid contained in the housing space 101 can be forced to enter the first radial slot 224 via the fluid inlet port 211 and exit the first radial slot 224 via the fluid outlet port 212, during which the actuator 27 can be pushed by the fluid flow to move towards the fluid outlet port 212. Each actuator 27 includes an upper body 271 and a lower body 272 (see FIG. 16). The upper body 271 has toothed portions 273 at its two sides. The lower body 272 has toothed portions 274 at its two sides. The toothed portions 273 and the toothed portiond 274 can be fitted together to form a rectangular tubular body, in which a plurality of baffles 275, 276 are provided. Preferably, the baffles 275, 276 are arranged alternately at two opposite inner surfaces of the rectangular tubular body. As the fluid passing through the rectangular tubular body, the force acting on the baffles 275, 276 due to the fluid velocity enables the actuator to move towards the fluid outlet port 212. The force applied to each actuator is proportional to the number of the baffles inside the actuator. The more an actuator contains baffles, the more the actuator is subjected to a pushing force.

Each actuator 27 defines an engagement hole 277. Each stem 26 defines an engagement hole 261. One or more V-shaped arms 28, corresponding in number to the chambers 25, are pivotally mounted on the disk 22. Each V-shaped arm 28 is biased by a spring 51, such as a torsional spring, and located between an actuator 27 and an adjacent stem 26, such that two opposite ends of the arm are fixedly inserted into the engagement hole 277 of the actuator 27 and the engagement hole 261 of the stem 26; one end of the spring 51 is attached to the disk 22 while the other end of the torsional spring 51 is urged against the actuator 27 (see FIG. 6). As such, each actuator 27 is coupled to a stem 27 by a V-shaped arm 28 therebetween; the spring 51 normally forces its V-shaped arm 28 to drive the actuator 27 to move away from the fluid outlet port 212 or the input shaft 311 when the fluid does not enter the first radial slot 224, and thus the stem 26 is driven by the V-shaped arm 28 to be far away from the chamber 25.

Figure 6:
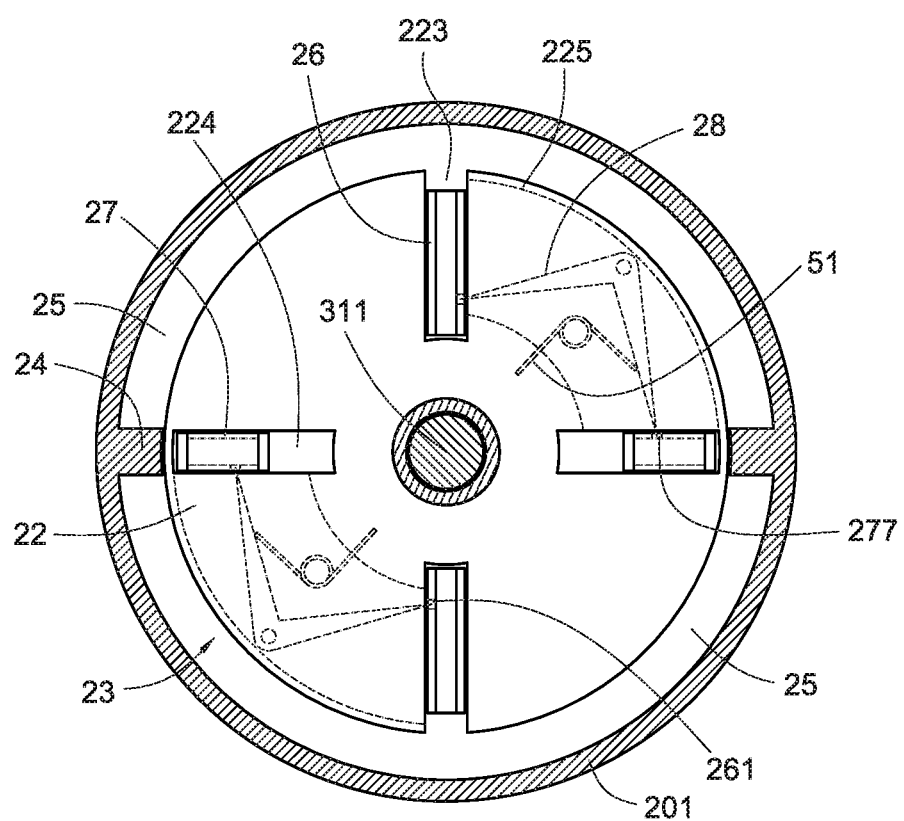
FIG. 6 shows a sectional view taken along line C-C in FIG. 3.

More specifically, the disk 22 defines one or more recesses 225, which correspond in number to the V-shaped arms 28 (see FIG. 6). Each recess 225 communicates with one first radial slot 224 and one second radial slot 223 adjacent to the first radial slot 224 and can accommodate one V-shaped arm 28 together with an associated spring 51. Thus, when the fluid enters the first radial slots 224 via the fluid inlet ports 211 to overcome the force of the springs 51 acting on the V-shaped arms 28, the actuators 27 can be moved towards the fluid outlet pors 212, and thus the stems 26 can be driven by the V-shaped arms 28 to move towards the chambers 25.

Figure 9:
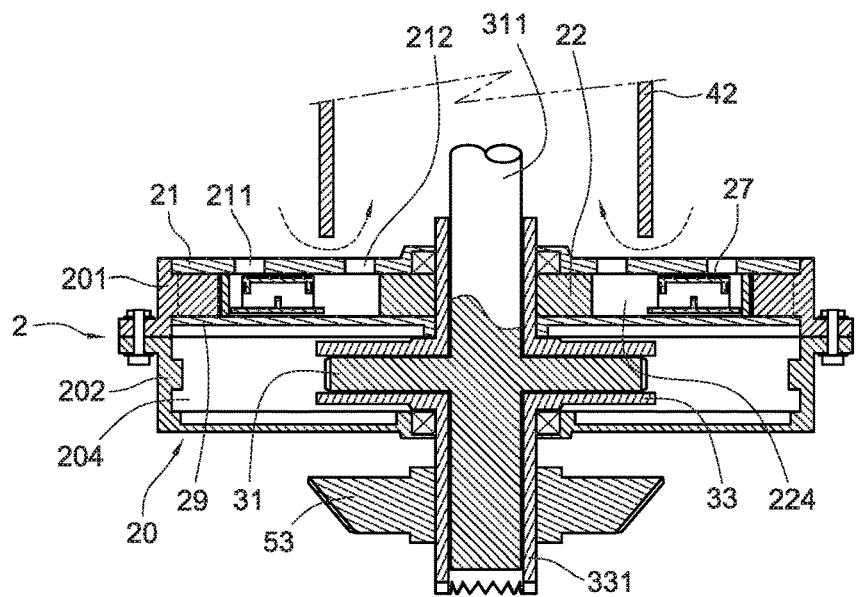
FIGS. 9 and 10 show working views of the mechanical power conversion device according to FIG. 3.
Figure 10:
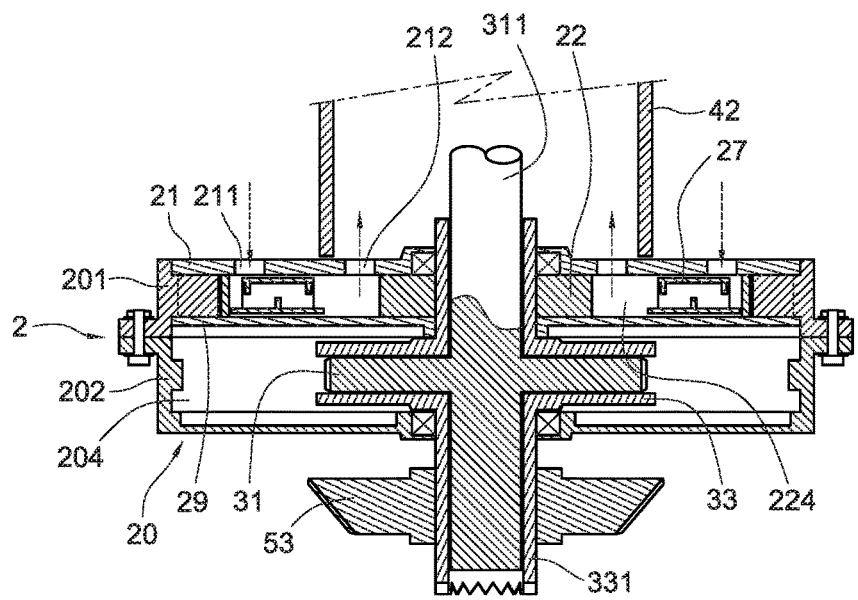
Figure 11:
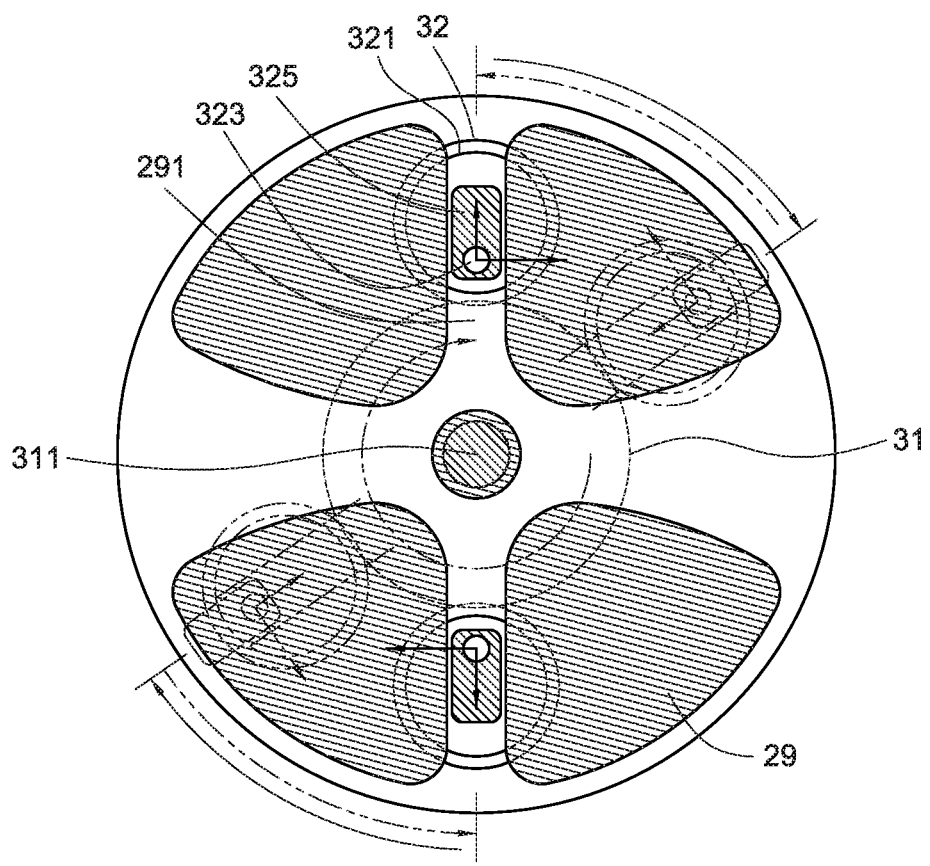
FIG. 11 shows a working view of the mechanical power conversion device according to FIG. 5.
Figure 12:
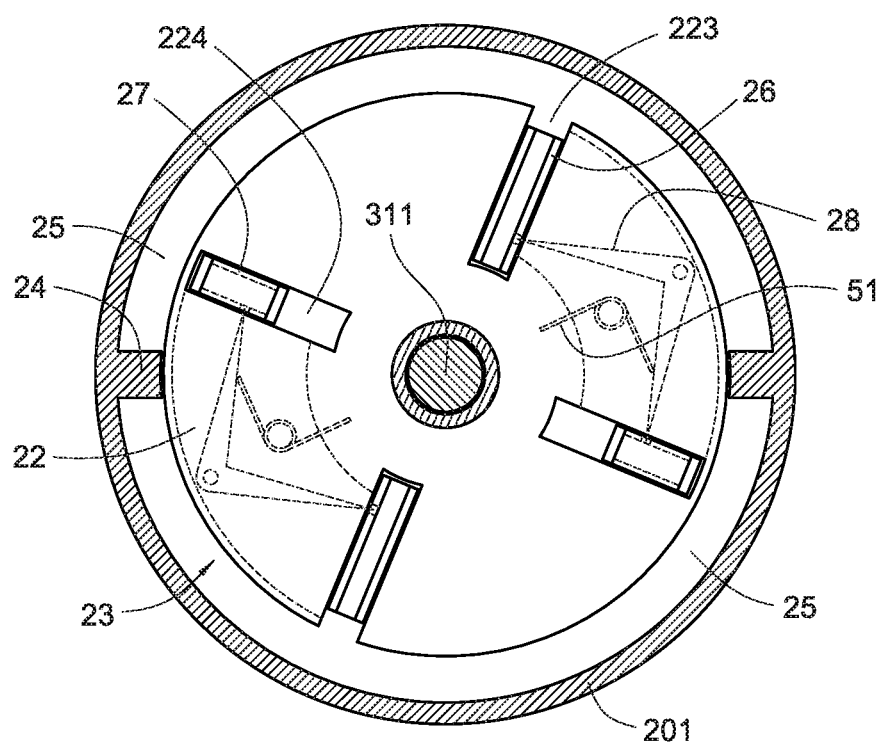
FIGS. 12 and 13 show working views according to FIG. 6, wherein actuators and stems mounted on a disk are manifested.
Figure 13:
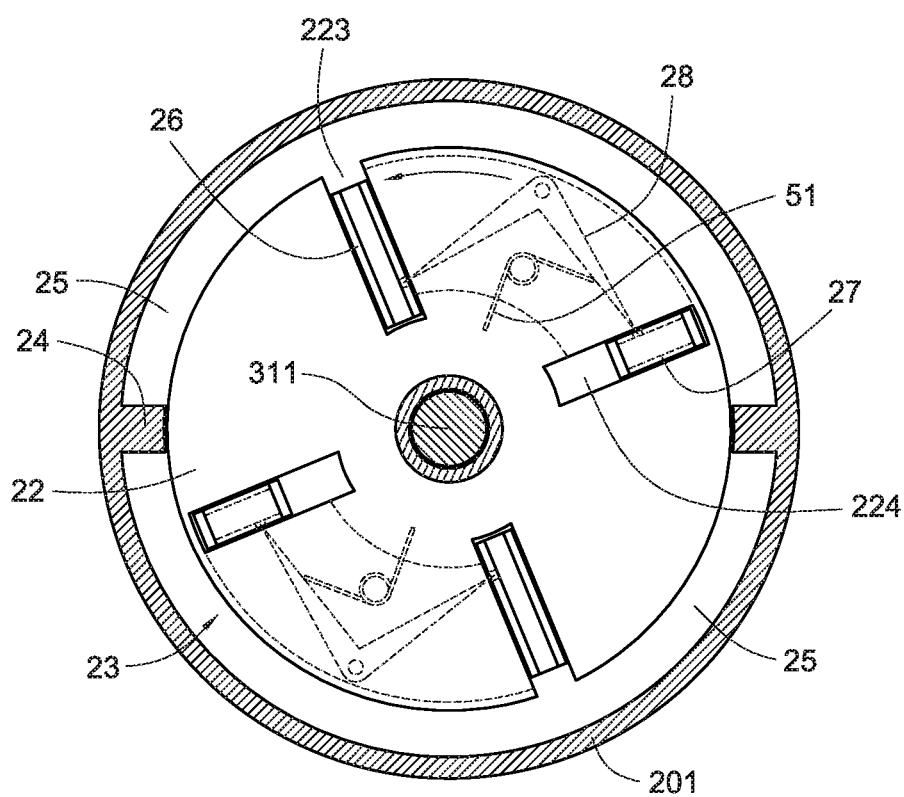

The input shaft 311 serves as an input terminal, through which external mechanical power can be supplied into the mechanical power conversion device. The final output shaft 52, which is coupled to the intermediate output shat 331, serves as an output terminal, through which mechanical power can be delivered to other equipment. When a user turns the adjustment unit 43 to have the movable sleeve 42 moved away from the control assembly 2 (see FIG. 9), the fluid contained in the housing space 101 may enter the stationary sleeve 41 via a gap between the movable sleeve 42 and the control assembly 2. Under this circumstance, the fluid does not enter the first radial slots 224, so that the springs 51 being urged against the V-shaped arms 28 cause the actuators 27 to move towards the fluid inlet ports 211; consequently, the stems 26 can be driven by the V-shaped arms 28 to retract into the second radial slots 223, so that the stems 26 can be clear of the chambers 25. On the other hand, when a user turns the adjustment unit 43 in a reverse direction to cause the movable sleeve 42 to move towards the control assembly 2 and enclose the fluid outlet ports 212 (see FIG. 10), since there is no substantial gap existing between the movable sleeve 42 and the control assembly 2, the fluid contained in the housing space 101 may enter the first radial slots 224 via the fluid inlet ports 211 and exit from the first radial slots 224 via the fluid outlet ports 212 to enter the stationary sleeve 41. Consequently, the fluid flow can overcome the force exerted by the springs 51 onto the actuators 27, and thus the stems 26 can be driven by the V-shaped arms 28 to move into the chambers 25, thus increasing the resistance or damping force acting on the disk 22. Thus, the reciprocating rotation of the disk 22 can be retarded. The more the fluid force acts on the actuators 27, the more the stems 26 are moved into the chambers 25. The force exerted by the fluid flow is dependent on the amount of the fluid entering the first radial slots 224. The less the gap exists between the movable sleeve 42 and the control assembly 2, the more the fluid enters the first radial slots 224. More specifically, in the condition of the sterns 26 being clear of the chambers 25 (see FIG. 6), as shown in the FIGS. 5 and 10, when the input shaft 311 is driven by external mechanical power, the planet pinions 32 can be driven by the sun gears 31 to rotate on their shaft portions 321, 322 as well as revovle around the sun gear 32 together with the carrier 33. The rotation of the planet pinions 32 allows the first sliding plates 325 to move forth and back along the first guide grooves 291 of the upper cover 29 (see FIG. 11), and allows the second sliding plates 326 to move forth and back along the second guide grooves 203 of the lower cover 202. Under these circumstances, the planet pinions 32 rotate on their shaft portions 321, 322 as well as revolve around the sun gear 31 together with the carrier 33. The first sliding plates 325 moving forth and back along the first guide grooves 291 of the upper cover 29 (see FIGS. 11, 12 and 13), and the second sliding plates 326 moving forth and back along the second guide grooves 203 of the lower cover 202 cause the disk 22 to conduct reciprocating rotation with a predetermined amplitude, similar to the motion of a pendulum, relative to the case 20 (see FIGS. 11, 12 and 13). Under these circumstances, the mechanical power or torque cannot be completely transferred from the input shaft 311 to the intermediate output shaft 331.

Figure 14:
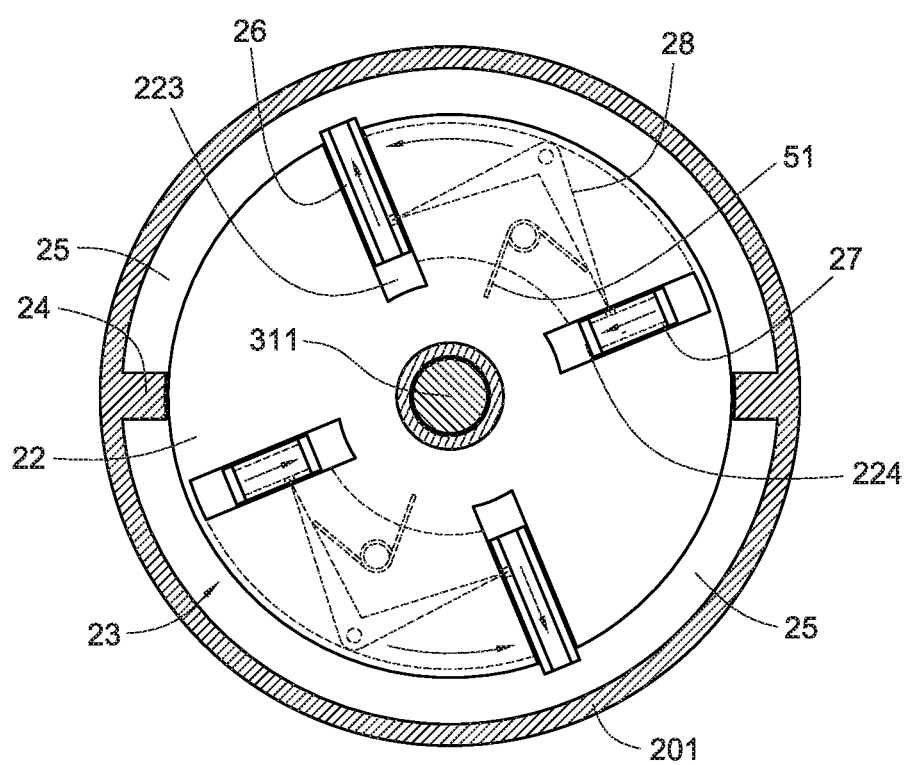
FIG. 14 shows a working view according to FIG. 6, wherein stems are partially moved into respective chambers.

In the condition of the stems 26 being partially moved into the chambers 25 (see FIG. 14), the rotation of the disk 22 is subjected to additional resistance or damping force, so that the rotation of the planet pinions 32 on their shaft portions 321, 322 can be retarded, and thus the speed of the planet-pinion carrier 33 revolving around the sun gear 31 can be increased, and thus the mechanical power or torque transferred from the input shaft 311 to the intermediate output shaft 331 can be increased. The more the stems 26 are moved into the chambers 25, the more the disk 22 is subjected to additional resistance; therefore, the torque ratio of the intermediate output shaft 331 to the input shaft 311 approach one.

Figure 15:
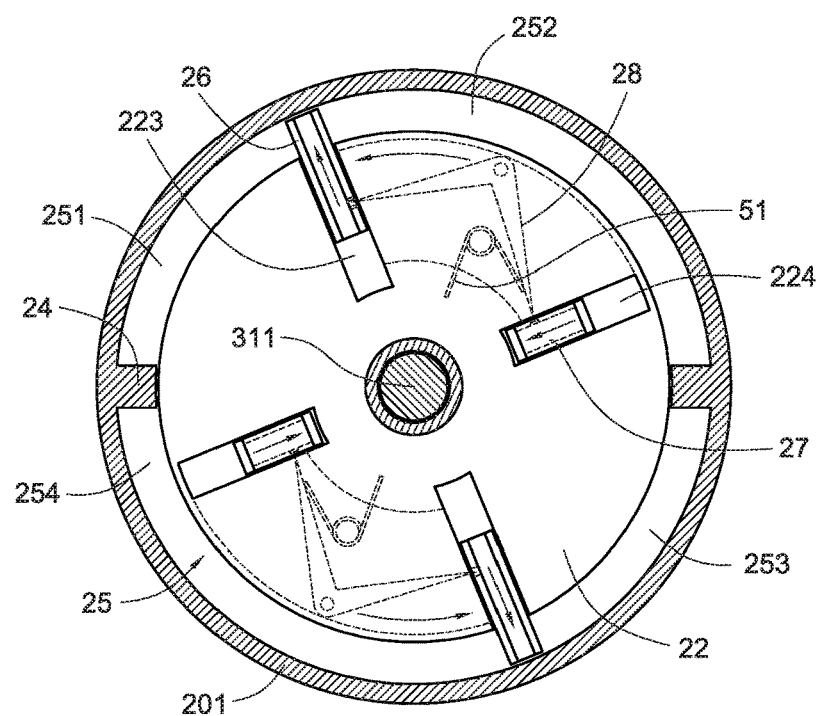
FIG. 15 shows a working view according to FIG. 6, wherein stems are completely moved into respective chambers.

In the condition of the sterns 26 being completely moved into the chambers 25 (see FIG. 15) to divide each chamber into two separate zones, as indicated by reference numerals 251, 252, 253 and 254, the pinions 32 cannot rotate on their shaft portions 321, 322, but are interlocked with the sun gear 31, so that the intermediate output shaft 331 together with the carrier 33 are driven at the same speed with the input shaft 311, and the mechanical power or torque can be completely transferred from the input shaft 311 to the output shaft 331 (i.e. the torque of the intermediate output shaft 331 is equal to the torque of the input shaft 311).

As a summary, the mechanical power conversion device of the present invention employs an impeller device driven by an input shaft to adjust the distance between a movable sleeve and a control assembly to regulate movement of stems fitted at a disk for controlling the mechanical power or torque being transferred from the input shaft to an output shaft. The present invention is applicable to different types of equipment. For example, when the input shaft of the mechanical power conversion device is connected to a shaft of a wind generator, and the output shaft thereof is locked, the mechanical power conversion device functions as a damper, through which the wind generator can be protected from high voltage burn due to high-speed rotation. When the input shaft of the mechanical power conversion device is connected to an engine crankshaft, and the output shaft is connected to a transmission input shaft, the mechanical power conversion device functions as a torque converter, which can adjust the torque being transferred from the input shaft to the output shaft.

The above embodiments illustrate preferred ways for implementing the present invention. However, they are not intended to limit the scope of the present invention. Accordingly, the scope of the present invention should be interpreted from the claims hereinafter appended.

What is claimed is:
1. A mechanical power conversion device, comprising:
a housing being filled with a fluid;
at least one control assembly arranged in the housing, the control assembly including an input shaft and an intermediate output shaft, and defining one or more fluid inlet ports and one or more fluid outlet ports, the fluid inlet ports located at a distance farther from the input shaft than the fluid outlet ports; and
at least one stationary sleeve, corresponding in number to the control assembly, arranged in the housing, the input shaft extending through the stationary sleeve and extending out of the housing and being installed with an impeller device in the stationary sleeve, the intermediate output shaft being coupled to a final output shaft, a movable sleeve fitted around the stationary sleeve such that the distance between the movable sleeve and the control assembly is adjustable;
whereby the impeller device can be rotated by the input shaft to force the fluid to enter the control assembly via the fluid inlet ports and exit the control assembly via the fluid outlet ports to control mechanical power or torque being transferred from the input shaft to the intermediate ouput shaft.

2. The mechanical power conversion device of claim 1, wherein the control assembly includes a case, a sun gear and a plurality of planet pinions located in the case, the planet pinions being mounted at a carrier and meshed with the sun gear, the input shaft being joined to a rotation center of the sun gear, the intermediate output shaft extending from the carrier.

3. The mechanical power conversion device of claim 2, wherein the control assembly further includes a disk located in its case and rotatably fitted around the input shaft, thus defining an annular space between the case and the disk, the disk defining one or more first radial slots and defining one or more second radial slots, which correspond in number to the first radial slots, the disk being fixedly attached thereon with an upper cover on which the fluid inlet ports and the fluid outlet ports are defined to communicate the first radial slots, the first and second radial slots being arranged alternately on the disk, wherein the planet pinions are provided with a means for guiding the disk to conduct reciprocating rotation with a predetermined amplitude;

the case of the control assembly is provided with at least one protrusion to divide the annular space into one or more chambers corresponding in number to the first radial slots; one or more actuators corresponding in number to the chambers are movably fitted in the first radial slots; one or more stems corresponding in number to the chamers are movably fitted in the second radial slots; one or more V-shaped arms corresponding in number to the chambers are pivotally mounted on the disk, each V-shaped arm being biased by a spring, wherein two opposite ends of each V-shaped arm are respectively attached to one actuator and one stem adjacent to the actuator; whereby when the movable sleeve is moved towards the control assembly, the impeller device forces the fluid to enter the first radial slots via the fluid inlet ports to move the actuators towards the fluid outlet ports, and thus the stems are driven by the V-shaped arms to move into the chambers, causing the disk to be subjected to additional resistance or damping force and thus retarding the rotation of the planet pinions on their shaft portions; when the movable sleeve is moved away from the control assembly, the fluid does not enter the first radial slots, so that the actuators are driven by the V-shaped arms, due to the biasing force of the springs, to move towards the fluid inlet ports, and thus the stems are driven by the V-shaped arms to move into the second radial slots to be clear of the chambers, causing the disk to conduct reciprocating rotation freely.

4. The mechanical power conversion device of claim 3, wherein the fluid inlet ports and the fluid outlet ports are located over two opposite ends of the first radial slots; the force applied to the actuators by the fluid entering the first radial slots overcomes the biasing force of the springs, thus moving the actuators towards the fluid outlet ports.

5. The mechanical power conversion device of claim 4, wherein each actuator is formed as a rectangular tubular body and provided therein with a plurality of baffles, on which the fluid entering the first radial slots exerts force due to fluid velocity, so that the actuators are capable of being forced to move toward the fluid outlet ports; the force applied to each actuator is proportional to the number of the baffles of the actuator.

6. The mechanical power conversion device of claim 5, wherein the baffles of each actuator is arranged alternately at two opposite inner surfaces thereof.

7. The mechanical power conversion device of claim 6, wherein the means for guiding the disk to conduct reciprocating rotation includes a lower cover fixedly attached to a lower surface of the disk, a first sliding plate pivotally connected to a first eccentric pin provided at one end of one planet pinion, and a second sliding plate pivotally connected to a second eccentric pin provided at an opposite end of the planet pinion and located at one side of a rotation center of the planet pinion opposite to the first eccentric pin, wherein the lower cover defines a first guide groove at its lower surface to accommodate the first sliding plate, and the case defines a second guide groove at its inner bottom surface to accommodate the second sliding plate; whereby when the planet pinions are rotated by the sun gear, the first sliding plate are moved forth and back along the first guide groove, and the second sliding plate are moved forth and back along the second guide groove, so that the disk are guided by the first and second sliding plates to conduct reciprocating rotation relative to the case.

8. The mechanical power conversion device of claim 3, wherein the spring is a torsional spring, one end of which is fixedly attached to the disk while an opposite end of which is urged against the actuator.

9. The mechanical power conversion device of claim 1, wherein the stationary sleeve is provided therein with a plurality of guide vanes for guiding the fluid flowing through the stationary sleeve.

10. The mechanical power conversion device of claim 1, wherein the movable sleeve is provided at its top with a limiter to limit the displacement of the movable sleeve, and the stationary sleeve is provided at its outer surface with a guide post for guiding the movable sleeve to move along the stationary sleeve.

11. The mechanical power conversion device of claim 1, wherein the input shaft is connected to a wind generator while the final output shaft is held stationary, so that the mechanical power conversion device functions as a damper.

12. The mechanical power conversion device of claim 1, wherein the input shaft is connected to an engine crankshaft while the output shaft is connected to a transmission input shaft, so that the mechanical power conversion device functions as a torque converter.

* * * * *